United States Patent
Al-Yami et al.

(10) Patent No.: US 10,494,559 B2
(45) Date of Patent: Dec. 3, 2019

(54) CEMENT SLURRIES, CURED CEMENT AND METHODS OF MAKING AND USE THEREOF

(71) Applicant: Saudi Arabian Oil Company, Dhahran (SA)

(72) Inventors: Abdullah Al-Yami, Dhahran (SA); Hussain AlBahrani, Qatif (SA); Vikrant Wagle, Abqaiq (SA); Ali Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/628,892

(22) Filed: Jun. 21, 2017

(65) Prior Publication Data
US 2018/0222797 A1 Aug. 9, 2018

Related U.S. Application Data

(60) Provisional application No. 62/454,189, filed on Feb. 3, 2017, provisional application No. 62/454,192, filed on Feb. 3, 2017.

(51) Int. Cl.
| | | |
|---|---|---|
| *E21B 21/00* | (2006.01) | |
| *C09K 8/22* | (2006.01) | |
| *B01F 17/00* | (2006.01) | |
| *C04B 24/02* | (2006.01) | |
| *C09K 8/20* | (2006.01) | |

(Continued)

(52) U.S. Cl.
CPC ............ *C09K 8/20* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(58) Field of Classification Search
None
See application file for complete search history.

(56) References Cited

U.S. PATENT DOCUMENTS

| | | |
|---|---|---|
| 2,589,949 A | 3/1952 | Meadors |
| 2,782,163 A | 2/1957 | Doyne et al. |

(Continued)

FOREIGN PATENT DOCUMENTS

| | | |
|---|---|---|
| AU | 5117264 A | 5/1967 |
| CA | 2495811 A1 | 3/2004 |

(Continued)

OTHER PUBLICATIONS

Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.

(Continued)

*Primary Examiner* — Anthony J Green
(74) *Attorney, Agent, or Firm* — Dinsmore & Shohl

(57) ABSTRACT

Cement slurries, cured cements, and methods of making cured cement and methods of using cement slurries are provided. The cement slurries have, among other attributes, improved rheology, such as improved flowability and pumpability and may be used, for instance, in the oil and gas drilling industry. The cement slurry contains water, a cement precursor material and a surfactant having the formula R—$(OC_2H_4)_x$—OH where R is a hydrocarbyl group comprising from 10 to 20 carbon atoms and x is an integer from 1 and 10. The cured cement have improved strength and density properties due to reduced fluid loss and even placement during curing. The cured cement contains a surfactant having the formula R—$(OC_2H_4)_x$—OH where R is a hydrocarbyl group comprising from 10 to 20 carbon atoms and x is an integer from 1 and 10.

9 Claims, No Drawings

(51) Int. Cl.

| | | |
|---|---|---|
| *C09K 8/74* | (2006.01) | |
| *E21B 43/25* | (2006.01) | |
| *C09K 8/03* | (2006.01) | |
| *C09K 8/40* | (2006.01) | |
| *E21B 33/14* | (2006.01) | |
| *C09K 8/035* | (2006.01) | |
| *C09K 8/08* | (2006.01) | |
| *C04B 28/02* | (2006.01) | |
| *C09K 8/42* | (2006.01) | |
| *C09K 8/48* | (2006.01) | |
| *C04B 24/08* | (2006.01) | |
| *C04B 28/04* | (2006.01) | |
| *C09K 8/487* | (2006.01) | |
| *C04B 7/52* | (2006.01) | |
| *C09K 8/46* | (2006.01) | |
| *C09K 8/04* | (2006.01) | |
| *C09K 8/467* | (2006.01) | |
| *C04B 28/08* | (2006.01) | |
| *C10M 173/00* | (2006.01) | |
| *C04B 14/06* | (2006.01) | |
| *C04B 38/02* | (2006.01) | |
| *C10M 105/18* | (2006.01) | |
| *C10M 105/62* | (2006.01) | |
| *C10M 107/34* | (2006.01) | |
| *C10M 111/04* | (2006.01) | |
| *C09K 8/32* | (2006.01) | |
| *C09K 8/36* | (2006.01) | |
| *C10M 173/02* | (2006.01) | |
| *C04B 103/40* | (2006.01) | |
| *C04B 103/46* | (2006.01) | |
| *C04B 111/00* | (2006.01) | |

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin et al. |
| 3,048,538 A | 8/1962 | Rosenberg et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A * | 7/1981 | Bivens ............... E21D 20/025 523/505 |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert, Jr. et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A * | 1/1994 | Cowan ............... C04B 28/04 106/661 |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow, Jr. |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Barnhorst et al. |
| 5,850,880 A | 12/1998 | Moran et al. |
| 5,996,693 A | 12/1999 | Heathman |
| 6,063,737 A | 5/2000 | Haberman et al. |
| H1932 H | 1/2001 | Heathman et al. |
| 6,258,756 B1 | 7/2001 | Hayatdavoudi |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 * | 12/2005 | Stanger ............... B01F 17/0057 524/800 |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 * | 6/2014 | Martin ............... C04B 24/34 524/3 |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2008/0006404 A1 | 1/2008 | Reddy et al. |
| 2008/0194432 A1 | 4/2008 | Heidlas |
| 2008/0171671 A1 | 7/2008 | Mueller et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Al-Subhi et al. |
| 2013/0153232 A1 | 6/2013 | Bobier et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |

(56) References Cited

U.S. PATENT DOCUMENTS

| | | |
|---|---|---|
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | | |
|---|---|---|---|
| CA | 2594108 A1 | 9/2008 | |
| CA | 2810345 A1 | 3/2012 | |
| CA | 2745017 A1 | 12/2012 | |
| CN | 102120158 A | 7/2011 | |
| CN | 101240218 B | 12/2011 | |
| CN | 102041138 B | 12/2011 | |
| CN | 102321461 A | 1/2012 | |
| CN | 102382697 A | 3/2012 | |
| CN | 102373042 B | 8/2013 | |
| CN | 102464974 B | 8/2013 | |
| CN | 103320203 A | 9/2013 | |
| CN | 102500141 B | 1/2014 | |
| CN | 103571599 A | 2/2014 | |
| CN | 102899152 B | 4/2014 | |
| CN | 102899154 B | 4/2014 | |
| CN | 102977940 B | 11/2014 | |
| CN | 104130839 A | 11/2014 | |
| CN | 104559954 A | 4/2015 | |
| CN | 103351925 B | 7/2015 | |
| CN | 102373053 B | 8/2015 | |
| CN | 103571578 B | 8/2015 | |
| CN | 104830513 A | 8/2015 | |
| CN | 104877749 A | 9/2015 | |
| CN | 104910881 A | 9/2015 | |
| CN | 105038737 A | 11/2015 | |
| CN | 103757640 B | 12/2015 | |
| CN | 105112036 A | 12/2015 | |
| CN | 103773041 B | 1/2016 | |
| CN | 105441051 A | 3/2016 | |
| CN | 104449893 B | 5/2016 | |
| CN | 103555304 B | 6/2016 | |
| CN | 105623814 A | 6/2016 | |
| CN | 105778992 A | 7/2016 | |
| CN | 105861135 A | 8/2016 | |
| EP | 0108546 A2 | 5/1984 | |
| EP | 0243067 A2 | 10/1987 | |
| EP | 0296655 A1 | 12/1988 | |
| EP | 315243 A1 | 5/1989 | |
| EP | 331158 A2 | 9/1989 | |
| EP | 0 395 815 A1 | 11/1990 | |
| EP | 1213270 B1 | 2/2005 | |
| EP | 2708586 A1 | 3/2014 | |
| GB | 2205748 A | 12/1988 | |
| GB | 2283036 A | 4/1995 | |
| GB | 2 343 447 A | 5/2000 | |
| JP | 07109472 A | 4/1995 | |
| WO | 8911516 A1 | 11/1989 | |
| WO | 9402565 A1 | 2/1994 | |
| WO | 9530818 A1 | 11/1995 | |
| WO | 9640836 A1 | 12/1996 | |
| WO | 9730142 A1 | 8/1997 | |
| WO | 98/36151 | 8/1998 | |
| WO | 9907816 A1 | 2/1999 | |
| WO | 01/23703 A1 | 4/2001 | |
| WO | 2004/076561 A1 | 9/2004 | |
| WO | 2006012622 A2 | 2/2006 | |
| WO | 2006/120151 A2 | 11/2006 | |
| WO | 2007003885 A2 | 1/2007 | |
| WO | 2007/118328 A1 | 10/2007 | |
| WO | 2008081158 A2 | 7/2008 | |
| WO | 2009060405 A1 | 5/2009 | |
| WO | 2009138383 A1 | 11/2009 | |
| WO | 2010/030275 A1 | 3/2010 | |
| WO | WO-2012101594 A1 * | 8/2012 | ............ C04B 26/14 |
| WO | 2012158645 A1 | 11/2012 | |
| WO | 2013055843 A1 | 4/2013 | |
| WO | 2013154435 A1 | 10/2013 | |
| WO | 2014107391 A1 | 7/2014 | |
| WO | 2014164381 A1 | 10/2014 | |
| WO | 2015006101 A1 | 1/2015 | |
| WO | 2015/038117 A1 | 3/2015 | |
| WO | 2015041649 A1 | 3/2015 | |
| WO | 2016/189062 A1 | 12/2016 | |

OTHER PUBLICATIONS

Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.

Inoue et al., "Interactions Between Engine Oil Additive", J. Japan Petrol. Inst., 1981, 24 (2), 101-107.

Joshi et al., "Physiochemical Behaviour of Ternary System Based on Coconut Oil/C12/E8/n-pentanol/Water", J. Surface Sci. Technol., 2013, 29 (1-2), 1-13.

Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.

Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.

Min et al., "Research on Coking Dust Wettability of Strong Cohesiveness and Easy Mudding", Safety in Coal Mines, Tsinghua Tongfang Knowledge Network Technology Co., Ltd., 2006.

Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.

Nelson, Erik B., "Well Cementing Fundamentals", Oilfield Review, Summer 2012, vol. 24, No. 2, 59-60, Schlumberger.

Paswan et al., "Development of Jatropha oil-in-water emulsion drilling mud system", Journal of Petroleum Science and Engineering, 2016, vol. 144, p. 10-18.

Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.

Non-Final Office Action dated Jan. 16, 2018 pertaining to U.S. Appl. No. 15/485,479, filed Apr. 12, 2017.

International Search Report pertaining to International Application No. PCT/US2018/015191, filed Jan. 25, 2018, 6 pages.

Written Opinion pertaining to International Application No. PCT/US2018/015191, filed Jan. 25, 2018, 8 pages.

International Search Report and Written Opinion dated Mar. 16, 2018 pertaining to International Application No. PCT/US2018/015140.

International Search Report pertaining to International Application No. PCT/US2018/014986, filed Jan. 24, 2018, 8 pages.

Written Opinion pertaining to International Application No. PCT/US2018/014986, filed Jan. 24, 2018, 12 pages.

International Search Report and Written Opinion dated Apr. 3, 2018 for PCT/US2018/016182 Filed Jan. 31, 2018. pp. 1-13.

International Search Report and Written Opinion dated May 25, 2018, pertaining to International Application No. PCT/US2018/016167, filed Jan. 31, 2018, 20 pages.

(56) References Cited

OTHER PUBLICATIONS

International Search Report and Written Opinion dated May 29, 2018 pertaining to International Application No. PCT/US2018/015207 filed Jan. 25, 2018, 15 pages.
Office Action pertaining to U.S. Appl. No. 15/489,927 dated Jul. 6, 2018.
International Search Report and Written Opinion dated Apr. 3, 2018, pertaining to International Application PCT/US2018/016447, filed Feb. 1, 2018, 14 pages.
International Search Report and Written Opinion dated Apr. 20, 2018, pertaining to International Application PCT/US2018/016365, filed Feb. 1, 2018, 16 pages.
International Search Report and Written Opinion dated Apr. 20, 2018, pertaining to International Application PCT/US2018/016414, filed Feb. 1, 2018, 14 pages.
International Search Report and Written Opinion dated Apr. 16, 2018, pertaining to International Application PCT/US2018/016415, filed Feb. 1, 2018, 13 pages.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jcr_contents/par/tabbedcontent/tab_1780231844/textimage.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
Non-Final Office Action dated May 25, 2018 pertaining to U.S. Appl. No. 15/485,724, 6 pages.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 68 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Notice of Allowance and Fee(s) Due dated May 15, 2019 pertaining to U.S. Appl. No. 15/922,077, filed Mar. 15, 2018, 27 pgs.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 16/039,525, filed Jul. 19, 2018, 75 pgs.
U.S. Office Action dated Jul. 2, 2019 pertaining to U.S. Appl. No. 15/586,555, filed May 4, 2017, 92 pgs.
"Tridecyl Alcohol Ethoxylate," 2016, retrieved Jun. 28, 2019 from http://webcache.goggleusercontent.com/search?q=cache:OiTX51z527kJ:https://emochemicals.com/Ethoxylates/Ethoxylates/TRIDECYL-ALCOHOL-ETHOXYLATE&h1=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.

\* cited by examiner

CEMENT SLURRIES, CURED CEMENT AND METHODS OF MAKING AND USE THEREOF

CROSS-REFERENCE TO RELATED APPLICATIONS

This application claims priority to U.S. Provisional Patent Application Ser. No. 62/454,189 filed Feb. 3, 2017 and U.S. Provisional Patent Application Ser. No. 62/454,192 filed Feb. 3, 2017, both of which are incorporated by reference herein in their entirety.

TECHNICAL FIELD

Embodiments of the present disclosure generally relate to cement slurries and methods of making and using cement slurries and to cured cements and methods of making cured cement. Specifically, embodiments of the present disclosure relate to cement slurries and cured cements that have at least one surfactant and methods of making and using cement slurries and cured cements having a surfactant.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, for well abandonment (sealing an old well to eliminate safety hazards), and many other applications. These cement slurries must be able to consistently perform over a wide range of temperatures and conditions, as oil and gas wells can be located in a multitude of diverse locations. For example, a cement slurry may be used in conditions of from below 0° in freezing permafrost zones, and in temperatures exceeding 400° C. in geothermal wells and, as such, must be able to properly set under an assortment of conditions.

Proper hardening of a cement slurry can be vital to the strength and performance properties of the cured cement composition. However, conventional cement solutions have poor flowability due to the viscous nature of the slurry, creating concerns when handling or pumping the cement, as uniform placement of the slurry can be quite difficult. Moreover, cement slurries are often incompatible with other fluids that may be present in the casing or the wellbore wall, such as drilling fluids, and prolonged contact could cause the cement slurry to gel, preventing proper placement and removal of the cement. Additional problems are encountered when curing a cement slurry into a cured cement. Cement slurries often cure through water-based reactions and, thus, too much or too little water loss can negatively impact the hardening process. Water may be lost or gained due to inclement weather, the conditions of the soil surrounding the well, or a multitude of other factors.

SUMMARY

Accordingly, there is an ongoing need for cement slurries having good flowability and pumpability with improved fluid loss control and for cured cement compositions that have cured uniformly without unwanted additional additives or artificially created conditions. The present embodiments address these needs by providing cement slurries and methods of making and using cement slurries that have improved rheology and fluid loss control, and cured cements and methods of making cured cement that cures uniformly with improved hardness and good wettability.

In one embodiment, cement slurries are provided, which contain water, a cement precursor material and a surfactant having the formula $R-(OC_2H_4)_x-OH$, where R is a hydrocarbyl group comprising from 10 to 20 carbon atoms and x is an integer from 1 and 10. The surfactant may have a hydrophilic-lipophilic balance (HLB) of from 12 to 13.5.

In another embodiment, cured cements are provided, in which the cured cement contains a surfactant having the formula $R-(OC_2H_4)_x-OH$, where R is a hydrocarbyl group comprising from 10 to 20 carbon atoms and x is an integer from 1 and 10. The surfactant may have an HLB of from 12 to 13.5.

In another embodiment, methods of producing a cured cement are provided. The methods include mixing water with a cement precursor material and a surfactant having the formula $R-(OC_2H_4)_x-OH$, where R is a hydrocarbyl group comprising from 10 to 20 carbon atoms and x is an integer from 1 and 10. The surfactant may have an HLB of from 12 to 13.5. The method further includes curing the cement slurry into a cured cement.

In another embodiment, methods of cementing a casing a wellbore are provided. The methods include pumping a cement slurry into an annulus between a casing and a wellbore. The cement slurry includes water, a cement precursor material and a surfactant having the formula $R-(OC_2H_4)_x-OH$, where R is a hydrocarbyl group comprising from 10 to 20 carbon atoms and x is an integer from 1 and 10. The surfactant may have an HLB of from 12 to 13.5. The method further includes curing the cement slurry to cement the casing in the wellbore.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Embodiments of the present disclosure relate to cement slurries and methods of making and using cement slurries that have, among other attributes, improved rheology, such as improved flowability and pumpability. As used throughout the disclosure, "cement slurry" refers to a composition comprising a cement precursor that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these. Embodiments of the present disclosure also relate to methods of producing and using cement slurries, in some particular embodiments, for use in the oil and gas industries. Still further embodiments of the present disclosure relate to cured cements and methods of producing cured cements. As used throughout this disclosure, "cured cement" refers to the set, hardened reaction product of the components of a cement slurry.

As a non-limiting example, the cement slurries and cured cement compositions of the present disclosure may be used in the oil and gas drilling industries, such as for cementing in oil and gas wells. Oil and gas wells may be formed in subterranean portions of the Earth, sometimes referred to as subterranean geological formations. The wellbore may serve to connect natural resources, such as petrochemical products, to a ground level surface. In some embodiments, a wellbore may be formed in the geological formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid, known as "drilling mud," may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the geological formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cement slurry properly harden into cured cement. If the cement slurry is not evenly placed or fluid is lost from the cement slurry before curing, the cement slurry may not evenly harden into a cured cement. Therefore, the viscosity and flowability of a cement slurry is important to ensure proper placement. Similarly, reducing fluid loss from the cement slurry ensures uniform hardening, as curing often involves water-based reactions with the cement slurry. Too much or too little water affects the hardness and, thus, the quality of the cured cement produced.

A number of conditions may impact the fluid loss of a cement slurry. For instance, water may be drawn from the slurry into the permeable formation, particularly if pumping ceases and the slurry becomes static without hardening. Water may also be lost due to displacement as the cement slurry is passed through constrictions, such as the tight clearance between a casing and an annulus, which may "squeeze" water from the slurry. Adverse weather and soil conditions may additional impact the amount of water present in the cement slurry. As such, control of fluid loss of the cement slurry may allow for a more uniform and stronger cured cement.

The present disclosure provides cement slurries which may have, among other attributes, improved rheology and reduced fluid loss to address these concerns. The cement slurry of the present disclosure includes water, a cement precursor material, and a surfactant. Without being bound by any particular theory, use of the surfactant along with the cement precursor material in some embodiments may provide reduced viscosity of the cement slurry to allow for easier processing, flowability, and handling of the cement slurry in various applications. In some embodiments, use of the surfactant along with the cement precursor material may provide reduced water content in the cement slurry and, in some embodiments, may reduce the friction pressure of the cement slurry to aid in drying and curing the cement slurry. In some embodiments, use of the surfactant along with the cement precursor material may additionally improve efficiency and performance of other optional additives, such as fluid loss additives. Moreover, dispersing the cement and reducing the friction between the cement and water will reduce the pumping pressure needed to pump and place cement into the well.

The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, calcium alluminate, silica sand, silica flour, hematite, manganese tetroxide, other similar compounds, and combinations of these. The cement precursor material may include Portland cement, siliceous fly ash, calcareous fly ash, slag cement, silica fume, any known cement precursor material or combinations of any of these.

In some embodiments, the cement slurry may contain from 0.001 to 10% BWOC (by weight of cement), or less than 1% BWOC.

Water may be added to the cement precursor material to produce the slurry. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 wt. % to 70 wt. % water based on the total weight of the cement slurry. In some embodiments, the cement slurry may contain from 10 wt. % to 40 wt. %, from about 10 wt. % 30 wt. %, 10 wt. % to 20 wt. %, from 20 wt. % to 40 wt. %, or from 20 wt. % to 30 wt. % of water. The cement slurry may contain from 20 wt. % to 40 wt. %, or from 25 wt. % to 35 wt. %, such as 30 wt. % of water based on the total weight of the cement slurry.

Along with the cement precursor material and water, the cement slurry may include at least one surfactant. According to one or more embodiments, the surfactant may have the chemical structure of Formula (I):

R—(OC$_2$H$_4$)$_x$—OH  Formula (I)

In Formula (I), R is a hydrocarbyl group having from 10 to 20 carbon atoms and x is an integer from 1 to 10. As used in this disclosure, a "hydrocarbyl group" refers to a chemical group consisting of carbon and hydrogen. Typically, a hydrocarbyl group may be analogous to a hydrocarbon molecule with a single missing hydrogen (where the hydrocarbyl group is connected to another chemical group). The hydrocarbyl group may contain saturated or unsaturated carbon atoms in any arrangement, including straight (linear), branched, aromatic, or combinations of any of these configurations. The hydrocarbyl R group in some embodiments may be an alkyl (—CH$_3$), alkenyl (—CH═CH$_2$), alkynyl (—C≡CH), or cyclic hydrocarbyl group, such as a phenyl group, which may be attached to a hydrocarbyl chain.

In one or more embodiments, R may include from 10 to 20 carbons, such as from 10 to 18 carbons, from 10 to 16 carbons, from 10 to 14 carbons, or from 10 to 12 carbons. R may have from 11 to 20 carbons, from 13 to 20 carbons, from 15 to 20 carbons, from 17 to 20 carbons, from 10 to 15 carbons, or from 12 to 15 carbons, or from 12 to 14 carbons. In some embodiments, R may have 12 carbons, 13 carbons, 14 carbons or 15 carbons. In some particular embodiments, R may have 13 carbons, and, in some embodiments, R may be C$_{13}$H$_{27}$ (iso tridecyl).

In Formula (I), x is an integer between 1 and 10. In some embodiments, x may be 1, 2, 3, 4, 5, 6, 7, 8, 9, or 10. In some embodiments, x may be an integer from 5 to 10, from 5 and 9, from 7 to 10, or from 7 to 9. In some embodiments, x may be an integer greater than or equal to 5, such as an integer greater than or equal to 7, or greater than or equal to 8.

The surfactant may be amphiphilic, meaning that it has a hydrophobic tail (the non-polar R group) and a hydrophilic head (the polar —OH groups from ethylene oxide and the alcohol group) that may lower the surface tension between two liquids or between a liquid. In some embodiments, the surfactant may have a hydrophilic-lipophilic balance (HLB) of from 11 to 13. Without being bound by any particular theory, the HLB of the compound is the measure of the degree to which it is hydrophilic or lipophilic, which may be determined by calculating values for the regions of the molecules in accordance with the Griffin Method in accordance with Equation 1:

$$HLB = 20 \times \frac{M_h}{M}$$  Equation 1

In Equation 1, $M_h$ is the molecular mass of the hydrophilic portion of the molecule and M is the molecular mass of the entire molecule. The resulting HLB value gives a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble). In some embodiments, the surfactant may have an HLB of from 12 to 13.5. The surfactant may have an HLB of from 12 to 13, from 12.5 to 13.5, from 12.25 to 13.5, from 12.25 to 13, from 12.25 to 13.25, or from 12.25 to 12.75. In some embodiments, the surfactant may have an HLB of 12, 12.5, 12.75, 13, 13.25, or 13.5. This HLB value may indicate that the surfactant has both hydrophilic and lipophilic affinities (as the surfactant is amphiphilic) but has a slightly greater tendency towards being hydrophilic/lipophobic, and thus, may be water-soluble.

The cement slurry may contain from 0.1 to 10% BWOC of the surfactant based on the total weight of the cement slurry. For instance, the cement slurry may contain from 0.1 to 8% BWOC of the surfactant, from 0.1 to 5% BWOC of the surfactant, or from 0.1 to 3% BWOC of the surfactant. The cement slurry may contain from 1 to 10% BWOC, from 1 to 8% BWOC, from 1 to 5% BWOC, or from 1 to 3% BWOC of the surfactant. In some embodiments, the cement slurry may contain from 3 to 5% BWOC, from 3 to 8% BWOC, from 3 to 10, or from 5 to 10% BWOC of the surfactant.

The surfactant may be a reaction product of a fatty alcohol ethoxylated with ethylene oxide. As used throughout the disclosure, a fatty alcohol refers to a compound having a hydroxyl (—OH) group and at least one alkyl chain (—R) group. The ethoxylated alcohol compound may be made by reacting a fatty alcohol with ethylene oxide. The ethoxylation reaction in some embodiments may be conducted at an elevated temperature and in the presence of an anionic catalyst, such as potassium hydroxide (KOH), for example. The ethoxylation reaction may proceed according to Equation 2:

$$ROH + xC_2H_4O \xrightarrow{KOH} R(OCH_2CH_2)_xOH$$  Equation 2

The fatty alcohols used as the reactant in Equation 2 to make the ethoxylated alcohol compound could include any alcohols having formula R—OH, where R is a saturated or unsaturated, linear, or branched hydrocarbyl group having from 10 to 20 carbon atoms, from 10 to 16 carbon atoms, or from 12 to 14 carbon atoms. In some embodiments, R may be a saturated linear hydrocarbyl group. Alternatively, the fatty alcohol may include R that is a branched hydrocarbyl group.

In some embodiments, the R—OH group of the surfactant may be a naturally-derived or synthetically-derived fatty alcohol. Non-limiting examples of suitable fatty alcohols may include, but are not limited to capryl alcohol, perlargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoleyl alcohol, heptadecanol (heptadecyl alcohol) stearyl alcohol, nonadecyl alcohol, arachidyl alcohol, other naturally-occurring fatty alcohols, other synthetic fatty alcohols, or combinations of any of these. The fatty alcohol may be a naturally occurring fatty alcohol, such as a fatty alcohol obtained from natural sources, such as animal fats or vegetable oils, like coconut oil. The fatty alcohol may be a hydrogenated naturally-occurring unsaturated fatty alcohol. Alternatively, the fatty alcohol may be a synthetic fatty alcohol, such as those obtained from a petroleum source through one or more synthesis reactions. For example, the fatty alcohol may be produced through the oligomerization of ethylene derived from a petroleum source or through the hydroformylation of alkenes followed by hydrogenation of the hydroformylation reaction product. This synthetic fatty alcohol may demonstrate improved performance at high temperature and higher salinity levels.

As shown in Equation 2, the reaction product may have the general chemical formula $R—(OCH_2CH_2)_x—OH$, where R is a saturated or unsaturated, linear or branched hydrocarbyl group having from 10 to 20 carbon atoms. According to some embodiments, the R group may be an iso-tridecyl group ($—C_{13}H_{27}$), as depicted in Chemical Structure A. It should be understood that Chemical Structure A depicts one possible embodiment of the surfactant of Formula (I) in which the R group is a iso-tridecyl group, which is used as a non-limiting example. In some embodiments, Chemical Structure (A) may have 8 ethoxy groups (that is, x equals 8 in Chemical Structure (A)) such that the surfactant is a tridecyl alcohol ethyoxylate with an 8:1 molar ratio of ethylene oxide condensate to branched isotridecyl alcohol having the chemical formula $C_{13}H_{27}—(OCH_2CH_2)_8—OH$.

Chemical Structure (A)

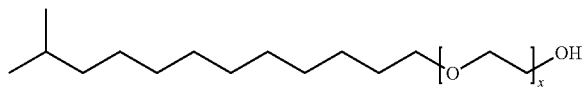

Generally, an x:1 molar ratio of the fatty alcohol to the ethylene oxide may be utilized to control the level of ethoxylation in Equation 2. In some embodiments, x may be from 1 to 10, such as 1, 2, 3, 4, 5, 6, 7, 8, 9, or 10. In some embodiments, the surfactant may be the reaction product of fatty alcohol ethoxylated with ethylene oxide at an 8:1 molar ratio of fatty alcohol to ethylene oxide. In some particular embodiments, the surfactant may be a synthetic alcohol oxylate and may be an ethylene oxide condensate of isotridecyl alcohol. The surfactant may be produced by an 8:1 molar ratio of ethylene oxide to isotridecyl alcohol. In some particular embodiments, the surfactant may be produced by an 8:1 molar ratio of ethylene oxide condensate to synthetic branched isotridecyl alcohol.

In some embodiments, the cement slurry may contain at least one additive other than the surfactant. The one or more additives may be any additives known to be suitable for cement slurries. As non-limiting examples, suitable additives may include accelerators, retarders, extenders, weighting agents, fluid loss control agents, lost circulation control agents, other surfactants, antifoaming agents, specialty additives such as elastomers or fibers, and combinations of these.

In some embodiments, the cement slurry may contain from 0.1 to 10% BWOC of the one or more additives based on the total weight of the cement slurry. For instance, the cement slurry may contain from 0.1 to 8% BWOC of the one or more additives, from 0.1 to 5% BWOC of the one or more additives, or from 0.1 to 3% BWOC of the one or more additives. The cement slurry may contain from 1 to 10% BWOC of the one or more additives, from 1 to 8% BWOC, from 1 to 5% BWOC, or from 1 to 3% BWOC of the one or more additives. In some embodiments, the cement slurry may contain from 3 to 5% BWOC, from 3 to 8% BWOC, from 3 to 10% BWOC, or from 5 to 10% BWOC of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lower pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethyl-cellulose (HEC). In other embodiments, the fluid loss additive may be a non-ionic synthetic polymer (for example, polyvinyl alcohol or polyethyleneimine). In some embodiments, the fluid loss additive may be an anionic synthetic polymer, such as 2-acrylamido-2-methylpropane sulfonic acid (AMPS) or AMPS-copolymers, including lattices of AMPS-copolymers. In some embodiments, the fluid loss additive may include bentonite, which may additionally viscosify the cement slurry and may, in some embodiments, cause retardation effects. Without being bound by any particular theory, the surfactant may reduce the surface tension of the aqueous phase of the cement slurry, thus reducing the fluid lost by the slurry. Additionally, the carboxylic acid may further reduce the fluid loss of the cement slurry by plugging the pores of the cement filter cake, minimizing space for the water or other fluids to escape from the cement.

In some embodiments, the fluid loss additive may contain a carboxylic fatty acid having from 16 to 18 carbon atoms, which may be used in combination with the surfactant to reduce fluid loss in the cement slurry. The carboxylic fatty acid includes any acids having formula ROOH in which R is a saturated or unsaturated, linear, or branched hydrocarbyl group having from 16 to 18 carbons, such as a hydrocarbyl group having 16 carbons, 17 carbons, or 18 carbons. Examples of suitable carboxylic fatty acids include palmitic acid, palmitoleic acid, vaccenic acid, oleic acid, elaidic acid, linoleic acid, α-linolenic acid, γ-linolenic acid, stearidonic acid, and combinations thereof. The surfactant may be in accordance with any of the embodiments previously described. In some specific embodiments, the fluid loss additive may contain a combination of an ethylene oxide condensate of branched isotridecyl alcohol with a fatty acid having from 16 to 18 carbon atoms in the hydrocarbyl group.

In some embodiments, the cement slurry may contain from 0.1% BWOC to 10% BWOC of one or more fluid loss additives, the one or more dispersants, or both. The cement slurry may contain from 0.02 to 90 lb/bbl of the fluid loss additives, the one or more dispersants, or both based on the total weight of the cement slurry. For instance, the cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

Embodiments of the disclosure also relate to methods of producing the cement slurries previously described. In some embodiments, the method for producing a cement slurry may include mixing water with a cement precursor material and at least one surfactant to produce a cement slurry. As previously described, the surfactant may have the formula R—$(OC_2H_4)_x$—OH in which R is a hydrocarbyl group having from 10 to 20 carbon atoms and x is an integer from 1 to 10. In some embodiments, the surfactant may have an HLB of from 12 to 13.5. The water, cement precursor material, and surfactant may be in accordance with any of the embodiments previously described. The cement slurry may include one or more additives, including but not limited to dispersants and fluid loss additives. The mixing step, in some embodiments, may involve shearing the water, cement precursor material, surfactant, and, optionally, other additives at a suitable speed for a suitable period of time to form the cement slurry. In one embodiment, the mixing may be done in the lab using a standard API blender. 15 seconds at 4,000 RPM and 35 seconds at 12,000 RPM, The equation of mixing energy is:

$$\frac{E}{M} = \frac{k\omega^2 t}{V} \qquad \text{(Equation 3)}$$

Where
E=Mixing energy (kJ)
M=Mass of slurry (kg)
k=6.1×10$^{-8}$ m$^5$/s (constant found experimentally)
ω=Rotational speed (radians/s)
t=Mixing time (s)
V=Slurry volume (m$^3$)

Further embodiments of the present disclosure relate to methods of using the cement slurries previously described. In some embodiments, the method may include pumping the cement slurry into a location to be cemented and curing the cement slurry by allowing the water and the cement precursor material to react. The location to be cemented may, for instance, be a well, a wellbore, an annulus, or other such locations.

Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there, the cement slurry fills in the space between the casing and the actual wellbore, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

As used throughout the disclosure, "curing" refers to providing adequate moisture, temperature and time to allow the concrete to achieve the desired properties (such as hardness) for its intended use through one or more reactions between the water and the cement precursor material. In contrast, "drying" refers to merely allowing the concrete to achieve a moisture condition appropriate for its intended use, which may only involve physical state changes, as opposed to chemical reactions. In some embodiments, curing the cement slurry may refer to passively allowing time to pass under suitable conditions upon which the cement slurry may harden or cure through allowing one or more reactions between the water and the cement precursor material. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, a combination of these, or other such means. Usually, the cement will be cured and convert from liquid to solid due to formation conditions, temperature, and pressure. In the laboratory high temperature and high pressure curing chamber is used for curing the cement specimens at required conditions. Cubical molds (2"×2"×2") and cylindrical cells (1.4" diameter and 12" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., or greater than or equal to 120° F. The cement slurry may be cured at temperatures of from 50° F. to 250° F., or from 50° F. to 200° F., or from 50° F. to 150° F., or from 50° F. to 120° F. In some instances, the temperature may be as high as 500° F. The cement slurry may be cured for from 1 day to 14 days, such as from 3 to 14 days, or from 5 to 14 days, or from 7 to 14 days, or from 1 to 3 days, or from 3 to 7 days.

Further embodiments of the present disclosure relate to particular methods of cementing a casing in a wellbore. The method may include pumping a cement slurry into an annulus between a casing and a wellbore and curing the cement slurry. The cement slurry may be in accordance with any of the embodiments previously described. Likewise, curing the cement slurry may be in accordance with any of the embodiments previously described. As stated above, Cementing is performed when the cement slurry is deployed into the well via pumps, displacing the drilling fluids still located within the well, and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

Embodiments of the disclosure also relate to methods of producing cured cements. The method may include combining water with a cement precursor material, and a surfactant having the formula R—(OC$_2$H$_4$)$_x$—OH. The cement slurry, including the cement precursor material, water, and the surfactant all may be in accordance with any of the embodiments previously described. The method may include curing the cement slurry by allowing for a reaction between the water and the cement precursor material to produce cured cement. The curing step may be in accordance with any of the embodiments previously described.

Embodiments of the disclosure also relate to cured cement compositions. The cured cement may include at least one surfactant having the formula R—(OC$_2$H$_4$)$_x$—OH, in which R is a hydrocarbyl group having from 10 to 20 carbon atoms and x is an integer from 1 and 10. The surfactant may be in accordance with any of the embodiments previous described. Embodiments of the disclosure are also directed to cured cement compositions comprising at least one surfactant having an HLB of from 12 to 13.5.

In some embodiments, cement is composed of four main components: tricalcium silicate (Ca$_3$O$_5$Si) which contributes to the early strength development; dicalcium silicate (Ca$_2$SiO$_4$), which contributes to the final strength, tricalcium aluminate (Ca$_3$Al$_2$O$_6$), which contributes to the early strength; and tetracalcium alumina ferrite. These phases are sometimes called alite and belite respectively. In addition, gypsum is added to control the setting time of cement.

In one embodiment, the silicates phase in cement may be about 75-80% of the total material. Ca$_3$O$_5$Si is the major constituent, with concentration as high as 60-65%. The quantity of Ca$_2$SiO$_4$ normally does not exceed 20% (except for retarded cements). The hydration products for Ca$_3$O$_5$Si and Ca$_2$SiO$_4$ are calcium silicate hydrate (Ca$_2$H$_2$O$_5$Si) and calcium hydroxide (Ca(OH)$_2$), also known as Portlandite. The calcium silicate hydrate commonly called CSH gel has a variable C:S and H:S ratio depending on the temperature, Calcium concentration in the aqueous phase, and the curing time. The CSH gel comprises +/−70% of fully hydrated Portland cement at ambient conditions and is considered the principal binder of hardened cement. By contrast, the calcium hydroxide is highly crystalline with concertation of about 15-20 wt. % and is the reason for the high pH of cement. Upon contact with water, the gypsum may partially dissolves releasing calcium and sulphate ions to react with the aluminate and hydroxyl ions produced by the C3A to form a calcium trisulphoaluminate hydrate, known as the mineral Ettringite (Ca$_6$Al$_2$(SO$_4$)$_3$(OH)$_{12}$.26H$_2$O) that will precipitate onto the Ca$_3$O$_5$Si surfaces preventing further rapid hydration (flash-set). The gypsum is gradually consumed and ettringite continues to precipitate until the gypsum is consumed. The sulphates ion concentration will be drop down and the ettringite will become unstable converting to calcium monosulphoaluminate hydrate (Ca$_4$Al$_2$O$_6$(SO$_4$).14H$_2$O). The remaining unhydrated Ca$_3$O$_5$Si will form calcium aluminate hydrate. Cement slurry design is based on the altering or inhibition of the hydration reactions with specific additives.

The cured cement may include one or more of calcium hydroxide, silicates, oxides, belite (Ca$_2$SiO$_5$), alite (Ca$_3$SiO$_4$), tricalcium aluminate (Ca$_3$Al$_2$O$_6$), tetracalcium aluminoferrite (Ca$_4$Al$_2$Fe$_2$O$_{10}$), brownmilleriate (4CaO.Al$_2$O$_3$.Fe$_2$O$_3$), gypsum (CaSO$_4$.2H$_2$O) sodium oxide, potassium oxide, limestone, lime (calcium oxide), hexavalent chromium, calcium alluminate, other similar compounds, and combinations of these. The cement precursor material may include Portland cement, siliceous fly ash, calcareous fly ash, slag cement, silica fume, any known cement precursor material or combinations of any of these.

The cured cement may contain from 0.1 to 10% BWOC of the at least one surfactant based on the total weight of the cured cement. For instance, the cured cement may contain from 0.1 to 8% BWOC of the surfactant, or from 0.1 to 5% BWOC of the surfactant, or from 0.1 to 3% BWOC of the surfactant. The cured cement may contain from 1 to 10% BWOC of the surfactant, from 1 to 8% BWOC, from 1 to 5% BWOC, or from 1 to 3% BWOC of the surfactant. In some embodiments, the cured cement may contain from 3 to 5% BWOC, from 3 to 8% BWOC, from 3 to 10% BWOC, or from 5 to 10% BWOC of the surfactant.

The cured cement may contain from 0.1 to 10% BWOC of one or more additives based on the total weight of the cured cement. The one or more additives may include accelerators, retarders, extenders, weighting agents, fluid loss control agents, lost circulation control agents, other surfactants, antifoaming agents, specialty additives, and combinations of these. For instance, the cured cement may contain from 0.1 to 8% BWOC of the one or more additives, or from 0.1% BWOC to 5% BWOC of the one or more additives, or from 0.1 to 3% BWOC of the one or more additives. The cured cement may contain from 1 to 10% BWOC of the one or more additives, or from 1 to 8% BWOC, or from 1 to 5% BWOC, or from 1 to 3% BWOC of the one or more additives. In some embodiments, the cured cement may contain from 3 to 5% BWOC, or from 3 to 8% BWOC, or from 3 to 10% BWOC, or from 5 to 10% BWOC of the one or more additives.

Without being bound by any particular theory, controlling the fluid loss and rheology properties of the cement slurry when producing the cured cement may result in a stronger, more stable cured cement, as previously discussed. In some embodiments, the cured cement of the present disclosure may have a compressive strength of from 400 to 5000 psi. in the compressive Strength Test. In the test, the set cement cubes were removed from the molds, and placed in a hydraulic press where increasing force was exerted on each cubes until failure. The hydraulic press system used in this study applied known compressive loads to the samples. This system was designed to test the compressive strength of sample cement cubes in compliance with API specifications for oil wells cement testing.

Similarly, the cured cement produced may have a higher density than conventional cements, which may not cure as uniformly, due to the issues previously described, such as rheology and fluid loss. In some embodiments, the cured cement may have a density of from 70 pounds per cubic foot (lb/f$^3$) to 160 lb/f$^3$.

The cured cement composition may have improved wettability properties. Wettability refers to the tendency for fluid to spread out on or adhere to a solid surface in the presence of other immiscible fluids. Without being bound by any particular theory, cement slurries and cured cement compositions having high wettability may reduce the risk of cement contamination and bonding problems to ensure a strong bong as the cement slurry is cured or dried into cured cement. This may produce a stronger annular seal between the annulus and the cured cement, as previously described.

In some embodiments, the cement slurry may contain water and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. In some embodiments, the addition of the alcohol surfactant to the cement slurry, the cured cement composition, or both, may address these difficulties to provide a better bond by rendering the well surface more water wet. Without being bound by theory, it is desirable to make the formation or/and casing water wet to enhance and improve the bonding between cement and casing and cement and formation. If the wettability of the formation or casing is oil wet not water wet then the bonding will be poor and could result in small gap(s) or channel(s) between the cement and casing or the cement and formation thereby resulting in improper wellbore isolation. This improper wellbore isolation could lead to fluid or gas escaping from the well through this gas or channel due to de-bonding.

As a non-limiting example, to perform a wettability test, casing coupons used in the test may be a piece of metal taken as a sample from the tubulars that will be cemented downhole. A piece of Teflon tape may be placed down the center of the casing coupon to provide a standard for a complete oil-wet surface To the left of the Teflon tape strip, the casing metal coupon is present while the side to the right of the tape is left unwashed. The washing is performed using surfactant. The side of casing coupon is washed in a viscometer cup filled with the specified surfactant solution. The viscometer is rotated at 100 RPM for 30 min and at a temperature of 140° F. A water droplet may be placed in each of the three sections. The droplet may be visually observed after a period of time, after undergoing a variety of conditions, or after a combination of both to determine the wettability. The same test procedure may be performed with a piece of cured cement composition in place of the casing coupon metal.

The droplet on the Teflon surface may not absorb into the cement but rather may maintain a contact angle with the test surface of from 120° to 1800. The droplet on the Teflon surface should consistently display poor wettability and can be used as a control sample. To the left and right of the Teflon strip, the water droplet may completely absorb into the cement, partially absorb into the cement, may spread out onto the cured cement, or may maintain its spherical droplet nature based on how water-wet the cement is. In some embodiments, a droplet having a contact angle of greater than 90° may be considered cement having poor water wettability. A droplet having a contact angle of less than 90° but greater than or equal to 350 may be considered cement having fair wettability. Finally, if the droplet has a contact angle of less than 35° the cement may have good wettability. Water wettability may be inversely related to oil wettability. That is, if a water droplet is repelled by the cement, it may be an indication that the cement is hydrophobic and may have good oil-wettability, or an affinity for oil.

As mentioned, the droplet may be observed under a variety of conditions. In some embodiments, the wettability of the cured cement, and/or the wettability of the casing coupon may be observed after preheating the cement for 30 minutes at a temperature of 140° F. Likewise, the cement may be immersed in an oil based mud for 10 minutes and the wettability may be observed. In some embodiments, the cement may be attached to a rotor or a viscometer cup and may be immersed in a spacer fluid such that at least about two thirds of the cement is immersed in the fluid. The cement is immersed while being attached to a side of viscometer cup to insure it remains static while the fluid is being stirred by the viscometer rotation The cement may be rotated at 100 rotations per minute (RPMs) for 30 minutes and the wettability determined. The intention of dipping the sample in oil based mud is to insure that the sample is "oil-wet". Oil wet samples will show a specific contact angle with water (<900). After that, the same sample may dipped in surfactant to try and convert it to being "water-wet". Water wet samples will show a different contact angle (>90°). If the surfactant is successful, it will be able to convert the sample into being a water-wet and this will be shown from the contact angle variations.

EXAMPLES

Rheology testing was conducted on various formulations of the cement slurry of the present embodiments as compared to conventional cement slurries. Notably, in some embodiments, the cement slurry of the present disclosure may have a viscosity as measured using a Fann 35 rheometer according to American Petroleum Institute Specification RP 13B at 600 rotations per minute (RPM) of less than 100 after 10 minutes. In some embodiments, the cement slurry may have a rheology reading at 600 RPM of less than or equal to 95, such as less than or equal to 90 after 10 minutes. In some embodiments, the cement slurry may have a viscosity at 600 RPM of from 75 to 100, or 75 to 95, or 80 to 95, or 80 to 90, or 80 to 100, or 85 to 100, after 10 minutes. In some embodiments, the cement slurry may have a viscosity at 300 RPM of less than or equal to 60, such as less than or equal to 55 after 10 minutes. In some embodiments, the cement slurry may have a viscosity at 300 RPM of from 50 to 75, or 55 to 75, or 50 to 65, or 50 to 60, or 50 to 55 after 10 minutes. In some embodiments, the cement slurry may have a viscosity at 200 RPM of less than or equal to 60, such as less than or equal to 55, or less than or equal to 50, or less than or equal to 45 after 10 minutes. In some embodiments, the cement slurry may have a viscosity at 200 RPM of from 40 to 65, or 45 to 65, or 40 to 55, or 40 to 50, or 45 to 50 after 10 minutes. In some embodiments, the cement slurry may have a viscosity at 100 RPM of less than or equal to 50, such as less than or equal to 40, or less than or equal to 35, or less 10 minutes. In some embodiments, the cement slurry may have a viscosity at 6 RPM of less than or equal to 15, such as from 10 to 15 after 10 minutes. In some embodiments, the cement slurry may have a viscosity at 3 RPM of less than or equal to 10, such as less than or equal to 8 after 10 minutes.

Fann Model 35 viscometers are used in research and production. These viscometers are recommended for evaluating the rheological properties of fluids, Newtonian and non-Newtonian. The design includes a R1 Rotor Sleeve, B1 Bob, F1 Torsion Spring, and a stainless steel sample cup for testing according to American Petroleum Institute Recommended Practice for Field Testing Water Based Drilling Fluids, API RP 13B-1/ISO 10414-1 Specification. The test fluid is contained in the annular space or shear gap between the cylinders. Rotation of the outer cylinder at known velocities is accomplished through precision gearing. The viscous drag exerted by the fluid creates a torque on the inner cylinder or bob. This torque is transmitted to a precision spring where its deflection is measured and then related to the test conditions and instrument constants. This system permits the true simulation of most significant flow process conditions encountered in industrial processing. Direct Indicating Viscometers combine accuracy with simplicity of design, and are recommended for evaluating materials that are Bingham plastics. Model 35 Viscometers are equipped with factory installed R1 Rotor Sleeve, B1 Bob, F1 Torsion Spring, and a stainless steel sample cup for testing according to American Petroleum Institute Specification RP 13B. Other rotor-bob combinations and/or torsion springs can be substituted to extend the torque measuring range or to increase the sensitivity of the torque measurement. Shear stress is read directly from a calibrated scale. Plastic viscosity and yield point of a fluid can be determined easily by making two simple subtractions from the observed data when the instrument is used with the R1-B1 combination and the standard F1 torsion spring.

In some embodiments the cement slurry may have a viscosity at 600 RPM of less than 150, or less than 130, or less than 125, or less than 120 after 30 minutes. In some embodiments, the cement slurry may have a viscosity at 300 RPM of less than or equal to 100, such as less than or equal to 90, such as less than or equal to 80 after 30 minutes. The cement slurry may have a viscosity at 200 RPM of less than or equal to 75, such as less than or equal to 70, or less than or equal to 65 after 30 minutes. The cement slurry may have a viscosity at 100 RPM of less than or equal to 60, such as less than or equal to 55, or less than or equal to 50 after 30 minutes. In some embodiments, the cement slurry may have a viscosity at 6 RPM of less than or equal to 15, or less than or equal to 12, such as from 10 to 15 after 30 minutes. In some embodiments, the cement slurry may have a viscosity at 3 RPM of less than or equal to 10, such as less than or equal to 8 after 30 minutes.

In some embodiments the cement slurry may have a viscosity at 600 RPM of less than 210, or less than 205, or less than 200 after 90 minutes. In some embodiments, the cement slurry may have a viscosity at 300 RPM of less than or equal to 150, such as less than or equal to 140, such as less than or equal to 130, such as less than or equal to 125 after 90 minutes. The cement slurry may have a viscosity at 200 RPM of less than or equal to 120, such as less than or equal to 110, or less than or equal to 100 after 90 minutes. The cement slurry may have a viscosity at 100 RPM of less than or equal to 100, such as less than or equal to 95, or less than or equal to 90, or less than or equal to 85 after 90 minutes. In some embodiments, the cement slurry may have a viscosity at 6 RPM of less than or equal to 20, or less than or equal to 15, or less than or equal to 12, such as from 10 to 15 after 90 minutes. In some embodiments, the cement slurry may have a viscosity at 3 RPM of less than or equal to 12, such as less than or equal to 10, or less than or equal to 8 after 90 minutes.

TABLE 1

Sample Compositions

| Sample | Composition |
| --- | --- |
| Example 1 | 353 cubic centimeters (cc) distilled water<br>2 grams (g) synthetic branched isotridecyl alcohol shown below.<br>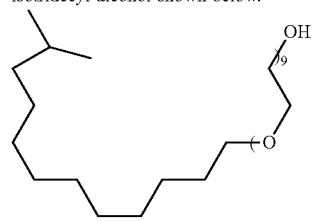<br>1 g retarder calcium lignosulfonate<br>800 g Portland Class G Cement |
| Comparative Example 1 | 353 cc distilled water<br>800 g Portland Class G Cement |
| Comparative Example 2 | 353 cc distilled water<br>1 g retarder<br>800 g Portland Class G Cement |
| Comparative Example 3 | 353 cc distilled water<br>2 g mono-ethanolamine<br>800 g Portland Class G Cement |
| Comparative Example 4 | 353 cc distilled water<br>1 g retarder<br>2 g mono-ethanolamine<br>800 g Portland Class G Cement |

Table 1 lists the compositions of each cement slurry sample tested. Example 1 is a cement slurry in accordance with the present disclosure. Example 1 contains 353 cubic centimeters (cc) of water as the water, 800 grams (g) cement as the cement precursor material, 2 g of synthetic branched isotridecyl alcohol as the at least one surfactant, and an additional additive of 1 g retarder. Comparative Example 1 is a cement slurry containing only water and cement without the surfactant or retarder. Comparative Example 2 is a cement slurry containing water, cement, and 1 g retarder, but no surfactant. Comparative Example 3 contains water, cement, and 2 g mono-ethanolamine as a surfactant that is not in accordance with embodiments of the present disclosure (as the surfactant does not include a compound with the formula R—(OC$_2$H$_4$)$_x$—OH where R is a hydrocarbyl group with 10 to 20 carbons and x is an integer from 1 to 10). Finally, Comparative Example 4 similar to Example 1 of the present disclosure as it contains cement, water, a retarder, and a surfactant, but again, mono-ethanolamine is used as the surfactant.

The viscosity of each sample was determined over various time intervals and various RPMs using a Fann 35 rheometer in accordance with API RP 13B-1/ISO 10414-1 Specifications. The Fann 35 rheometer has a dial reading scale up to 300, thus, "out of 300" refers to a viscosity over 300 that is too viscous to be measured on the rheometer scale. Similarly, "gelled" refers to a composition so viscous that it formed a gel.

TABLE 2

Rheology Reading after 10 Minutes of Elapsed Time

| Sample Tested | 600 RPM | 300 RPM | 200 RPM | 100 RPM | 6 RPM | 3 RPM |
| --- | --- | --- | --- | --- | --- | --- |
| Example 1 | 88 | 56 | 45 | 34 | 13 | 7 |
| Comparative Example 1 | 156 | 119 | 104 | 87 | 12 | 10 |
| Comparative Example 2 | 100 | 68.5 | 57 | 43.5 | 11 | 8 |
| Comparative Example 3 | 151 | 125 | 104 | 82 | 19 | 13 |
| Comparative Example 4 | 140 | 100 | 88 | 68 | 15 | 10 |

TABLE 3

Rheology Reading after 30 Minutes of Elapsed Time

| Sample Tested | 600 RPM | 300 RPM | 200 RPM | 100 RPM | 6 RPM | 3 RPM |
| --- | --- | --- | --- | --- | --- | --- |
| Example 1 | 120 | 78 | 67 | 51 | 12 | 8 |
| Comparative Example 1 | Out of 300 | 281 | 243 | 169 | 17 | 13 |

TABLE 3-continued

Rheology Reading after 30 Minutes of Elapsed Time

| Sample Tested | 600 RPM | 300 RPM | 200 RPM | 100 RPM | 6 RPM | 3 RPM |
|---|---|---|---|---|---|---|
| Comparative Example 2 | 170 | 122 | 94 | 68 | 14 | 9 |
| Comparative Example 3 | 156 | 125 | 110 | 91 | 13 | 11 |
| Comparative Example 4 | 234 | 176 | 140 | 88 | 12 | 8 |

TABLE 4

Rheology Reading after 90 Minutes of Elapsed Time

| Sample Tested | 600 RPM | 300 RPM | 200 RPM | 100 RPM | 6 RPM | 3 RPM |
|---|---|---|---|---|---|---|
| Example 1 | 206 | 128 | 110 | 86 | 15 | 10 |
| Comparative Example 1 | Gelled | Gelled | Gelled | Gelled | Gelled | Gelled |
| Comparative Example 2 | Out of 300 | 265 | 234 | 182 | 75 | 75 |
| Comparative Example 3 | Gelled | Gelled | Gelled | Gelled | Gelled | Gelled |
| Comparative Example 4 | Gelled | Gelled | Gelled | Gelled | Gelled | Gelled |

As shown in Tables 2 to 4, Example 1 of the present embodiments showed superior rheology as compared to Comparative Examples 1-4. As shown in Tables 2 to 4, the viscosity of Example 1 is less than any of the comparative examples, including Comparative Example 4. Having a low viscosity may allow the cement slurry to be more easily and more precisely positioned, for instance, in an oil or gas well. Notably, under all conditions tested, Example 1 did not gel, even after 90 minutes of elapsed time at 600 to 3 RPM. When a cement slurry gels it may become quite difficult to handle and place the slurry, which may be rendered unpumpable and may be difficult to remove.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A cement slurry comprising:
   water;
   Portland cement precursor;
   calcium lignosulfonate; and
   a surfactant comprising the formula:

R—(OC$_2$H$_4$)$_x$—OH where R is an isotridecyl (C$_{13}$H$_{27}$) group, and
   x is 9.

2. The cement slurry of claim 1, where the surfactant has a hydrophilic-lipophilic balance (HLB) of from 12 to 13.5.

3. The cement slurry of claim 2, where the cement slurry contains from 10 to 70 wt % BWOC (By Weight Of Cement Precursor) water.

4. The cement slurry of claim 2, where the cement slurry contains from 10 to 90 wt % BWOC of the cement precursor material.

5. The cement slurry of claim 2, where the cement slurry contains from 0.1 to 10 wt % BWOC of the surfactant.

6. The cement slurry of claim 2, where the cement slurry contains from 0.1 to 10 wt % BWOC of one or more additives selected from the group consisting of accelerators, retarders, extenders, weighting agents, fluid loss control agents, lost circulation control agents, other surfactants, antifoaming agents, and combinations of these.

7. The cement slurry of claim 1, where the surfactant has an HLB of from 12.5 to 13.

8. The cement slurry of claim 2, where the surfactant comprises ethylene oxide condensate of branched isotridecyl alcohol.

9. The cement slurry of claim 2, where the cement slurry has a viscosity of less than 100 centipoises (cP) after 10 minutes as measured using a Fann 35 rheometer according to API RP 13B-1/ISO 10414-1 at 600 rotations per minute (RPM).

\* \* \* \* \*